(12) United States Patent
Chiba et al.

(10) Patent No.: US 8,370,724 B2
(45) Date of Patent: Feb. 5, 2013

(54) AUDIO REPRODUCTION DEVICE, INFORMATION REPRODUCTION SYSTEM, AUDIO REPRODUCTION METHOD, AND PROGRAM

(75) Inventors: Takahiro Chiba, Kanagawa (JP); Hiroyuki Fukuchi, Kanagawa (JP); Ryuji Tokunaga, Tokyo (JP)

(73) Assignee: Sony Corporation, Tokyo (JP)

( * ) Notice: Subject to any disclaimer, the term of this patent is extended or adjusted under 35 U.S.C. 154(b) by 487 days.

(21) Appl. No.: 12/686,586

(22) Filed: Jan. 13, 2010

(65) Prior Publication Data

US 2010/0185916 A1 Jul. 22, 2010

(30) Foreign Application Priority Data

Jan. 16, 2009 (JP) ................................. 2009-008250

(51) Int. Cl.
 *H03M 13/00* (2006.01)
(52) U.S. Cl. ........................................................ 714/776
(58) Field of Classification Search .................. None
 See application file for complete search history.

(56) References Cited

U.S. PATENT DOCUMENTS

| | | | | |
|---|---|---|---|---|
| 5,543,931 A * | 8/1996 | Lee et al. | ...................... | 386/343 |
| 5,835,486 A * | 11/1998 | Davis et al. | ................... | 370/287 |
| 7,529,673 B2 * | 5/2009 | Makinen et al. | ............. | 704/265 |
| 7,596,489 B2 * | 9/2009 | Kovesi et al. | ................. | 704/219 |
| 8,077,707 B2 * | 12/2011 | Isnardi | .......................... | 370/389 |
| 2008/0046252 A1 * | 2/2008 | Zopf et al. | .................... | 704/501 |
| 2009/0240492 A1 * | 9/2009 | Zopf et al. | .................... | 704/219 |
| 2010/0056198 A1 * | 3/2010 | Tachibana | .................. | 455/550.1 |
| 2011/0066429 A1 * | 3/2011 | Shperling et al. | ............. | 704/228 |
| 2012/0082172 A1 * | 4/2012 | Isnardi | .......................... | 370/474 |

FOREIGN PATENT DOCUMENTS

| | | |
|---|---|---|
| JP | 01-306897 | 12/1989 |
| JP | 09-284706 | 10/1997 |
| JP | 2002-204221 | 7/2002 |

OTHER PUBLICATIONS

Digital cellular telecommunications system (Phase 2+); Substitution and muting of lost frames for Adaptive Multi Rate (AMR) speech traffic channels (GSM 06.91 version 7.1.1 Release 1998) ETSI EN 301 705 V7.1.1 (Apr. 2000).*

Digital cellular telecommunications system (Phase 2+); Adaptive Multi-Rate (AMR); Speech processing functions; General description (GSM 06.71 version 7.0.2 Release 1998) ETSI EN 301 703 V7.0.2 (Dec. 1999).*

* cited by examiner

*Primary Examiner* — Ajay Bhatia
*Assistant Examiner* — Daniel McMahon
(74) *Attorney, Agent, or Firm* — Wolf, Greenfield & Sacks, P.C.

(57) ABSTRACT

An audio reproduction device includes a decoding processor to decode input voice data, a discontinuousness determination unit to determine whether or not a packet is discontinuous with a preceding packet, a reset processing unit to reset decode information, a frequency analysis unit to perform frequency analysis on the decoded data, an envelope calculation unit to calculate an envelope of the decoded data, a level difference calculation unit to calculate a level difference of the decoded data, a correction processing unit to apply a specific correction process to the decoded data if the correction process is necessary, and a processing determination unit to determine whether or not the correction process is to be performed, to determine whether or not the packet data is discontinuous, to determine which correction process is to be applied, and to output an instruction to perform the correction process.

12 Claims, 13 Drawing Sheets

DISCONTINUOUS POINT

⇩ MUTING PROCESS

SOUNDLESS SECTION AFTER MUTING PROCESS. NOISE IS NOT PRESENT, BUT VOICE IS DEFECTIVE.

GENERAL DECODING PROCESS
USING COEFFICIENT TABLE

DECODING PROCESS WHICH RECEIVES RESET
INSTRUCTION AT THE TIME OF DISCONTINUOUSNESS.
IN DRAWING, FOR EXAMPLE, COEFFICIENT TABLE IS INITIALIZED TO 0.

AUDIO REPRODUCTION DEVICE, INFORMATION REPRODUCTION SYSTEM, AUDIO REPRODUCTION METHOD, AND PROGRAM

BACKGROUND OF THE INVENTION

1. Field of the Invention

The present invention relates to an audio reproduction device applicable to audio reproduction of a CD player, a DVD player, a television set or the like, an information reproduction system, an audio reproduction method, and a program.

2. Description of the Related Art

In an audio (voice) reproduction device, if a discontinuous voice stream of data is reproduced, noise may be generated at the discontinuous point thereof, causing displeasure in a listener.

To this end, in general, as shown in FIG. 1, muting control of a voice signal is performed before and after the discontinuous point so as to prevent noise from being generated (for example, see Japanese Unexamined Patent Application Publication No. 2002-204221).

SUMMARY OF THE INVENTION

However, in general, since mute processing is performed with respect to plural pieces of sample data, it may affect a portion of voice data and incomprehensible voice reproduction may result.

In particular, if discontinuous points are frequently generated, this tendency is significant.

It is desirable to provide an audio reproduction device, an information reproduction system, an audio reproduction method and a program, which reduces stops in voice reproduction due to muting and makes it easier to listen to voice reproduction.

According to an embodiment of the present invention, there is provided an audio reproduction device including a decoding processor configured to decode input voice data, a discontinuousness determination unit configured to determine from input packet information whether or not a packet is discontinuous with a preceding packet, a reset processing unit configured to reset decoding information if it is determined by the discontinuousness determination unit that the packet is discontinuous, a frequency analysis unit configured to perform frequency analysis on the data decoded by the decoding processor, an envelope calculation unit configured to calculate an envelope of the data decoded by the decoding processor, a level difference calculation unit configured to calculate the level difference of the data decoded by the decoding processor, a correction processing unit configured to be able to perform a plurality of correction processes and to apply a specific correction process to the decoded data if the correction process is necessary, and a processing determination unit configured to determine whether or not the correction process is to be performed from the result of the frequency analysis, to determine whether or not the packet data is discontinuous, to determine which correction process is to be applied by the envelope and the level difference if the packet data is discontinuous, and to output an instruction to perform the correction process according to the result of the determination.

According to another embodiment of the present invention, there is provided an information reproduction system including an audio reproduction device configured to reproduce voice data from transmitted information, wherein the audio reproduction device includes a decoding processor configured to decode input voice data, a discontinuousness determination unit configured to determine from input packet information whether or not a packet is discontinuous with a preceding packet, a reset processing unit configured to reset decoding information if it is determined that the packet is discontinuous by the discontinuousness determination unit, a frequency analysis unit configured to perform frequency analysis on data decoded by the decoding processor, an envelope calculation unit configured to calculate an envelope of the data decoded by the decoding processor, a level difference calculation unit configured to calculate the level difference of the data decoded by the decoding processor, a correction processing unit configured to be able to perform a plurality of correction processes and to apply a specific correction process to the decoded data if the correction process is necessary, and a processing determination unit configured to determine whether or not the correction process is to be performed from the result of the frequency analysis, to determine whether or not the packet data is discontinuous, to determine which correction process is to be applied by the envelope and the level difference if the packet data is discontinuous, and to output an instruction to perform the correction process according to the result of the determination.

According to another embodiment of the present invention, there is provided an audio reproduction method including the steps of decoding input voice data, determining from input packet information whether or not a packet is discontinuous with a preceding packet, resetting the decoding information if, in determining discontinuousness, it is determined that the packet is discontinuous, performing frequency analysis on decoded data, calculating an envelope of the decoded data, calculating the level difference of the decoded data, determining whether or not a correction process is to be performed from the results of the frequency analysis, determining whether or not the packet data is discontinuous, determining which correction process is to be applied by the envelope and the level difference if the packet data is discontinuous, and outputting an instruction to perform the correction process according to the result of the determination, and applying a specific correction process to the decoded data if the correction process is necessary.

According to another embodiment of the present invention, there is provided a program for executing, on a computer, an audio reproduction method including the steps of decoding input voice data, determining from input packet information whether or not a packet is discontinuous with a preceding packet, resetting decoding information if, in determining discontinuousness, it is determined that the packet is discontinuous, performing frequency analysis on the decoded data, calculating an envelope of the decoded data, calculating the level difference of the decoded data, determining whether or not a correction process is to be performed from the results of the frequency analysis, determining whether or not the packet data is discontinuous, determining which correction process is to be applied by the envelope and the level difference if the packet data is discontinuous, and outputting an instruction to perform the correction process according to the result of the determination, and applying a specific correction process to the decoded data if the correction process is necessary.

According to the present invention, it is determined from the input packet information whether or not the packet is discontinuous with the preceding packet, by the discontinuousness determination unit. If it is determined that the packet is discontinuous, the decoding information is reset by the reset processing unit.

The frequency analysis of the data decoded by the decoding processor is performed by the frequency analysis unit, the envelope of the decoded data is calculated by the envelope calculation unit, and the level difference of the decoded data is calculated by the level difference calculation unit.

The processing determination unit determines whether or not the correction process is to be performed from the results of the frequency analysis and determines whether or not the packet data is discontinuous. In addition, the processing determination unit determines which correction process is to be applied by the envelope and the level difference if the packet data is discontinuous and outputs the instruction to perform the correction process according to the result of the determination.

If the correction process is necessary, the correction processing unit applies the specific correction process to the decoded data.

According to the present invention, it is possible to reduce stops in voice reproduction due to muting and make it easier to listen to voice reproduction.

DESCRIPTION OF THE PREFERRED EMBODIMENTS

Hereinafter, embodiments of the present invention will be described with reference to the accompanying drawings. The description will be given in the following order.

1. First Embodiment (Configuration Example of Audio Reproduction Device)
2. Second Embodiment (First Example of Processing System)
3. Third Embodiment (Second Example of Processing System)
4. Fourth Embodiment (Third Example of Processing System)
5. Fifth Embodiment (Fourth Example of Processing System)

1. First Embodiment

Figure 1:
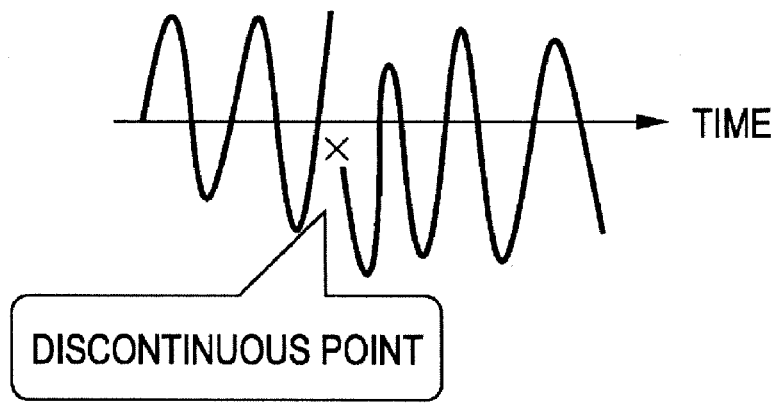
FIG. 1 is a schematic diagram of muting control of a discontinuous point in a general audio (voice) reproduction device.
Figure 1:
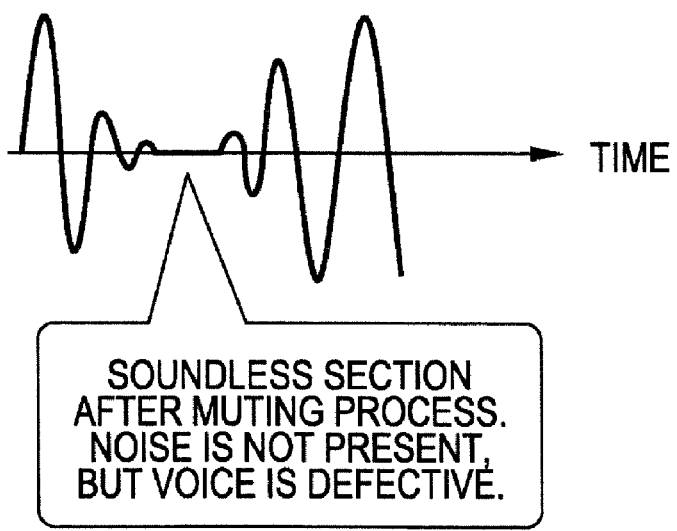
Figure 2:
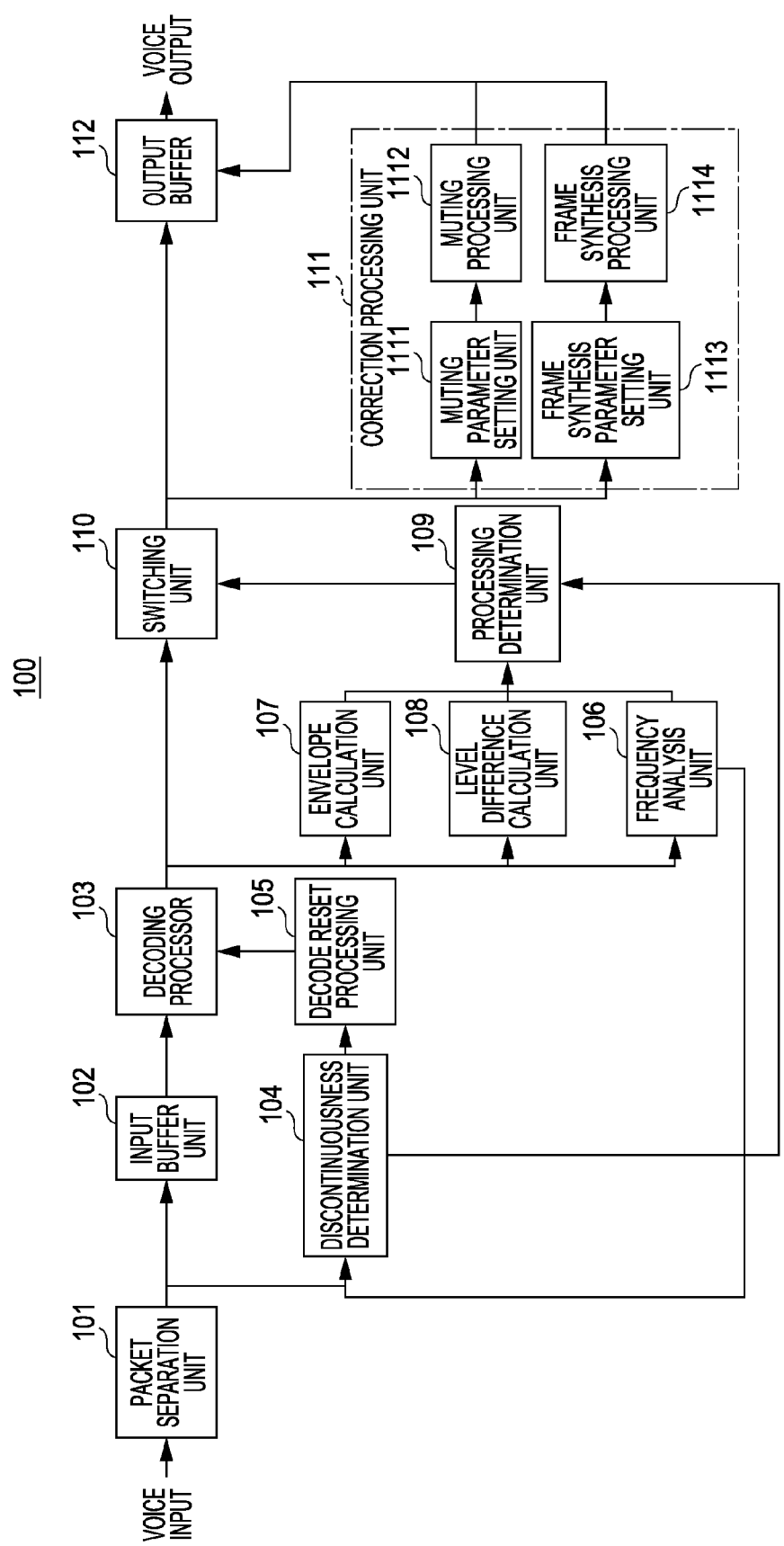
FIG. 2 is a block diagram showing a configuration example of an audio reproduction device according to an embodiment of the present invention.

FIG. 2 is a block diagram showing a configuration example of an audio reproduction device according to an embodiment of the present invention.

The audio reproduction device 100 according to the present embodiment is configured to determine the type of a correction process applied to a discontinuous point based on voice level, level difference and frequency analysis before and after a discontinuous point in an input signal so as to reduce the stops in voice reproduction due to muting.

The audio reproduction device 100 of FIG. 2 includes a packet separation unit 101, an input buffer unit 102, a decoding processor (or a decode processing unit) 103, a discontinuousness determination unit 104, and a decode reset processing unit 105.

The audio reproduction device 100 includes a frequency analysis unit 106, an envelope calculation unit 107, a level difference calculation unit 108, a processing determination unit 109, a switching unit 110, a correction processing unit 111, and an output buffer 112.

The correction processing unit 111 includes a muting parameter setting unit 1111, a mute processing unit 1112, a frame synthesis parameter setting unit 1113, and a frame synthesis processing unit 1114.

The packet separation unit 101 separates an input packet into voice data and packet information.

The packet separation unit 101 supplies the separated voice data to the input buffer unit 102 and outputs the packet information to the discontinuousness determination unit 104.

The input buffer unit 102 holds the voice data for a predetermined time and outputs the held voice data to the decoding processor 103.

The decoding processor 103 decodes the input voice data.

The decoding processor 103 supplies the decoded voice data to the frequency analysis unit 106, the envelope calculation unit 107, the level difference calculation unit 108 and the switching unit 110.

The discontinuousness determination unit 104 determines from the packet information whether or not this packet is discontinuous with a preceding packet.

The discontinuousness determination unit 104 outputs the result of determining whether or not the packet is discontinuous to the decode reset processing unit 105.

The discontinuousness determination of the discontinuousness determination unit 104 will now be described.

The discontinuousness determination unit 104 performs discontinuousness detection based on discontinuousness flag information set on a higher-level device side or by frequency analysis.

Next, the discontinuousness flag information set by the higher-level device will be described.

A flag indicating continuousness is given as attached information to the input voice data.

Packet loss is mainly determined by a network transport protocol and the flag information is set to "discontinuousness" in the case of the packet loss.

Figure 3:
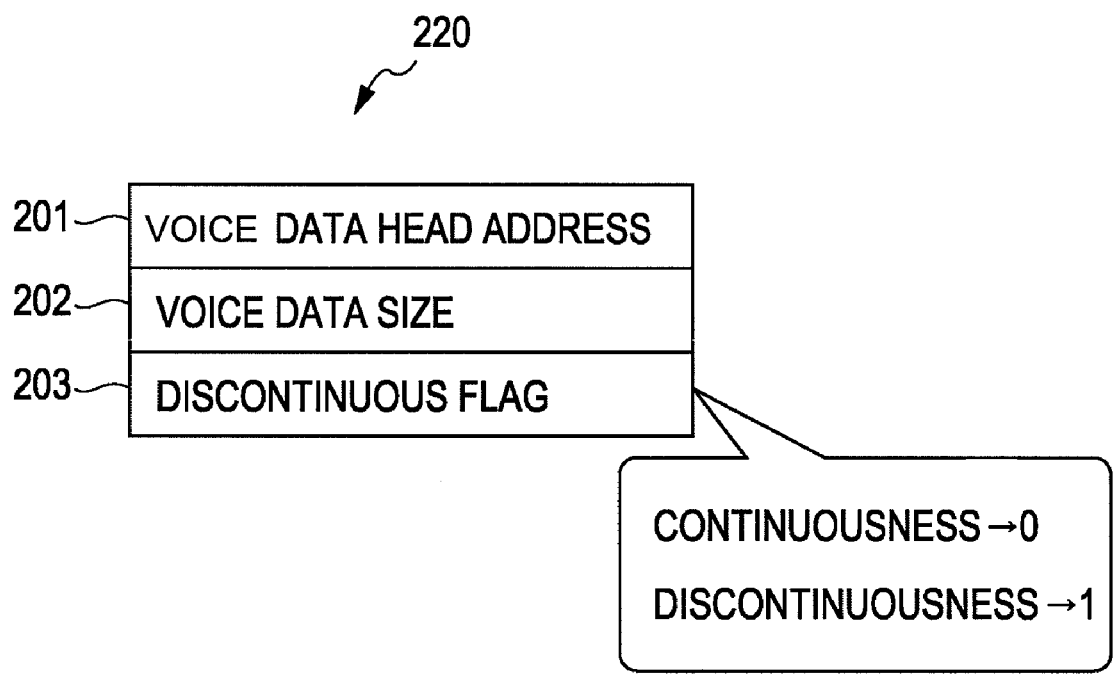
FIG. 3 is a diagram showing a structure example of discontinuousness flag information according to the present embodiment.

FIG. 3 is a diagram showing a structure example of discontinuousness flag information according to the present embodiment.

In detail, when the input voice data is given, the information shown in FIG. 3 is given in the structure.

In this example, an input information structure 200 is formed by a voice data head address 201, a voice data size 202, and a discontinuousness flag 203.

For example, the discontinuousness flag 203 is set to "0" at the time of continuousness and is set to "1" at the time of discontinuousness.

Next, "Discontinuousness detection by frequency analysis" will be described.

The discontinuousness determination unit 104 detects the discontinuousness of a voice frame by a shape variation of a frequency spectrum.

Figure 4:
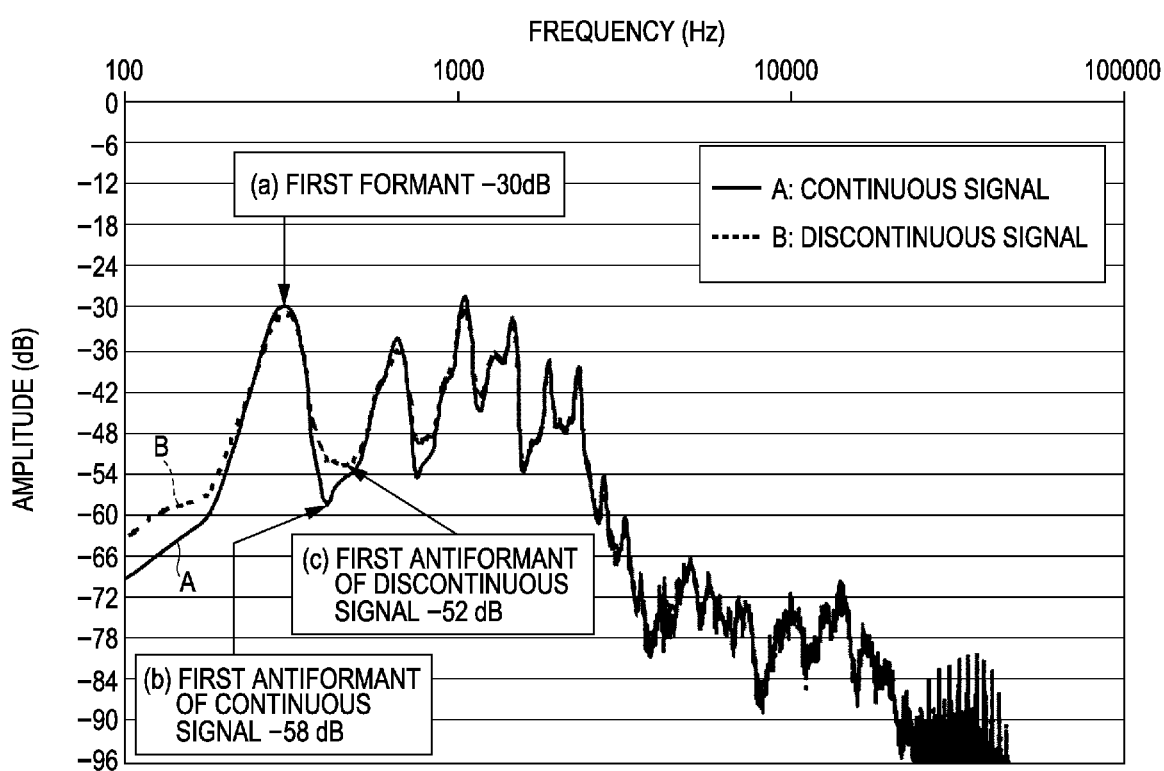
FIG. 4 is a diagram illustrating discontinuousness detection by frequency analysis.

FIG. 4 is a diagram illustrating discontinuousness detection by frequency analysis.

For example, the spectrum of Japanese "A" [a:] will be described with reference to FIG. 4.

In FIG. 4, when a continuous frame A and a discontinuous frame B are compared, a variation in gain is seen in a valley (antiformant) of the spectrum (points (b) and (c) of the drawing).

In detail, if a difference between the first formant F1 and the first antiformant UF1 is obtained, the continuous frame and the discontinuous frame are as follows.

In case of the continuous frame: $Diff1 = F1 - UF1 = 28$ db

In the case of the discontinuous frame: $Diff1 = F1 - UF1 = 22$ db. $\quad$ Equation 1

As a threshold value of gain for adjusting Gth, if the following relationship is satisfied, a discontinuous frame is determined (detected).

$Diff1 + Gth < 28$ db $\quad$ Equation 2

The detection unit of the discontinuousness determination unit 104 is not limited to the first formant and the first antiformant, and a combination of a second formant and a second antiformant or a higher formant and antiformant may be used.

The detection unit is based on the level difference between the formant and the antiformant and thus does not depend on the input signal level.

The decode reset processing unit 105 resets decoding information of the decoding processor 103 if it is determined that discontinuousness is determined by the discontinuousness determination unit 104.

The decode reset processing unit 105 performs a reset process of the decoding processor (decoder) 103 if it is determined that the packet is discontinuous by the discontinuousness determination unit 104.

This is because, if discontinuous data is decoded without modification according to the type of a codec such as AMR or AAC, values of various coefficients such as a filter process associated with the decoding process are changed and thus it is difficult to guarantee the decoding processing result.

According to the codec type, since a reset process may be unnecessary, it is determined whether or not the reset process is executed according to the codec type.

By performing the reset process of the decoding processor 103 on a discontinuous point, it is possible to return voice data after the discontinuous point with certainty.

In addition, if the discontinuousness is determined by the result of analysis of the frequency analysis unit 106, discontinuousness information is fed back to the discontinuousness determination unit 104 such that the reset process is executed at the time of the next decoding.

This is efficiently applied when an error occurs in discontinuousness determination by the flag from the higher-level device.

Figure 5A:
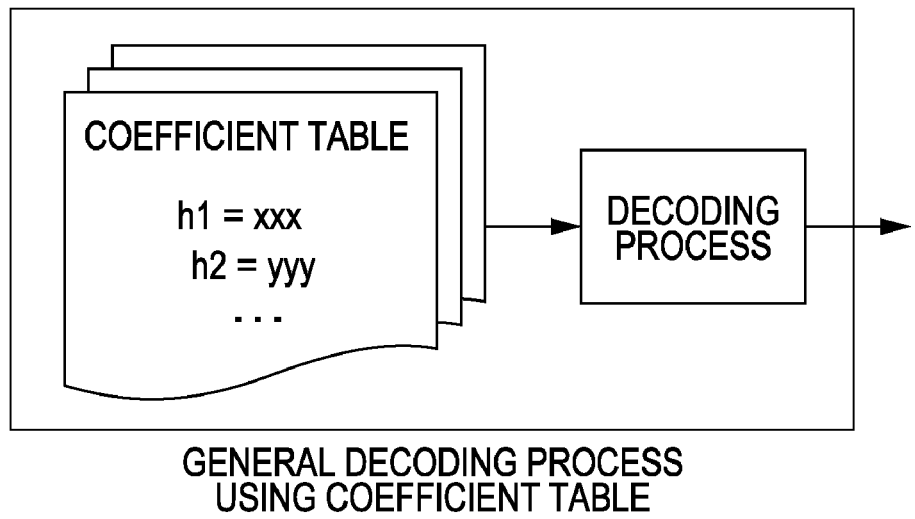
FIGS. 5A and 5B are conceptual diagrams of a decoding reset process according to the present embodiment.
Figure 5A:
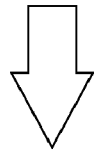
Figure 5B:
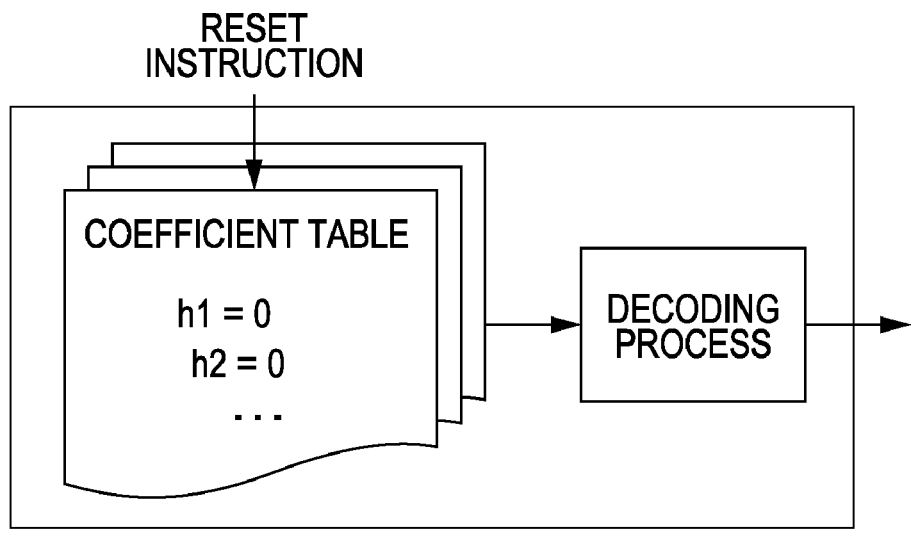

FIGS. 5A and 5B are conceptual diagrams of a decode reset process according to the present embodiment.

FIG. 5A shows a general decoding process using a coefficient table.

FIG. 5B shows a decoding process which receives a reset instruction at the time of discontinuousness.

In FIGS. 5A and 5B, for example, the coefficient table is initialized to 0.

The frequency analysis unit 106 performs frequency analysis on the decoded voice data and outputs the analyzed result to the processing determination unit 109.

The envelope calculation unit 107 calculates an envelope of the decoded voice data and outputs the calculated result to the processing determination unit 109.

The envelope is a maximum value of an absolute value of the voice signal level in any section.

The level difference calculation unit 108 calculates a voice level difference from the decoded voice data and outputs the calculated result to the processing determination unit 109.

The processing determination unit 109 has a function for determining whether or not a correction process is performed from the result of the frequency analysis and determining whether or not the packet is discontinuous.

The processing determination unit 109 determines which correction process is applied by the envelope and the level difference if the packet data is discontinuous.

The switching unit 110 outputs the decoded data to the correction processing unit 111 and the output buffer 112 so as to switch the correction process based on the result of the determination by the processing determination unit 109.

Now, the detailed determination process of the processing determination unit 109 will be described.

[First Determination Process]

Figure 6:
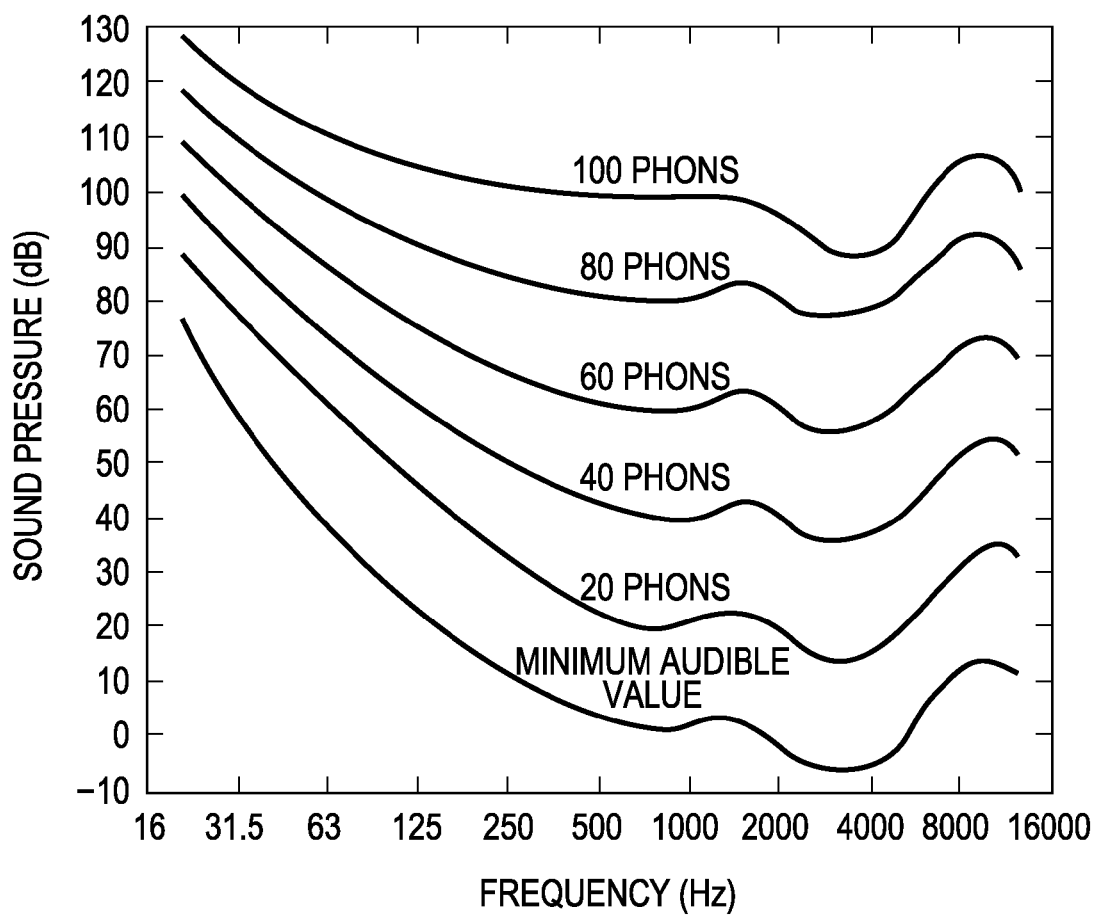
FIG. 6 is a diagram showing an equal-loudness curve.

FIG. 6 is a diagram showing an equal-loudness curve.

First, if a voice spectrum is obtained by the frequency analysis unit 106 and the spectrum is lower than a minimum audible range of the equal-loudness curve shown in FIG. 6, the processing determination unit 109 determines that it does not have a level audible to the human ear and there is no noise influence due to the discontinuous point.

In this case, the processing determination unit 109 instructs the switching unit 110 to output data to the output buffer 112 without performing the correction process.

The present invention is not limited to the minimum audible range and a curve of 20 phons may be used as a border of the determination.

In addition, the equal-loudness curve refers to a curve which is audible with the same sound quantity as the human ear.

If the spectrum of the voice is equal to or less than the minimum audible range, it is inaudible to the human ear.

[Second Determination Process]

The processing determination unit 109 performs the following correction process determination if it is determined that the spectrum is greater than the minimum audible range in the first processing determination.

If the decoded data is discontinuous, the processed content is switched according to the voice level of the discontinuous point.

Figure 7:
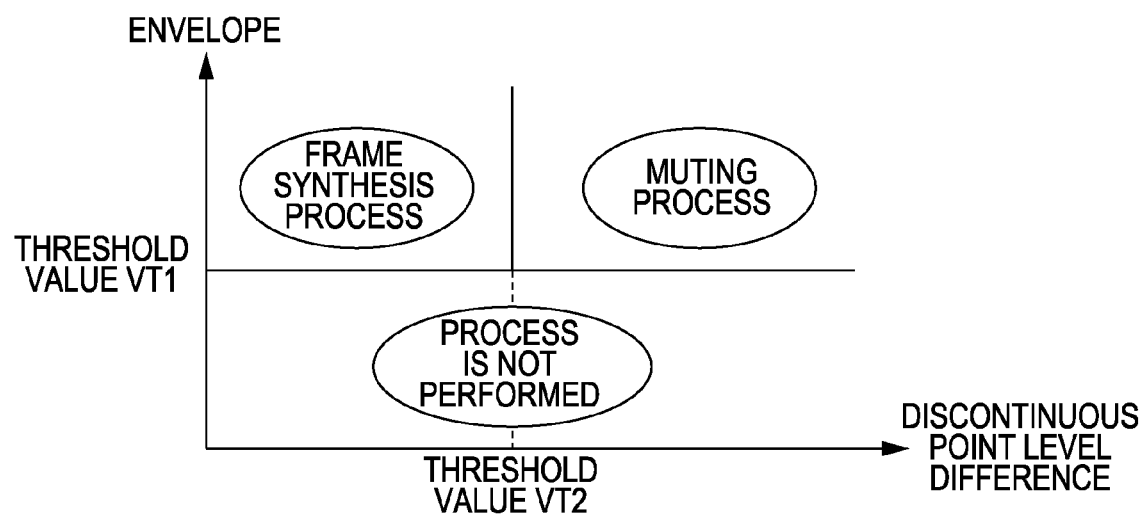
FIG. 7 is a conceptual diagram of a determination process for switching correction process of a processing determination unit according to the present embodiment.

FIG. 7 is a conceptual diagram of a correction process switching determination process of the processing determination unit according to the present embodiment.

In FIG. 7, a vertical axis denotes an envelope and a horizontal axis denotes a level difference of a discontinuous point.

If the envelope before and after the discontinuous point is less than any first threshold value VT1, the influence of noise is low and thus it is determined that processing of the discontinuous point is unnecessary.

If the envelope is greater than the threshold value VT1 and the voice level difference of the discontinuous point is less than any second threshold value VT2, a frame synthesis process is performed so as to soften the discontinuous point and, if the level difference is greater than the second threshold value VT2, noise generation is reliably avoided by a muting process.

Figure 8A:
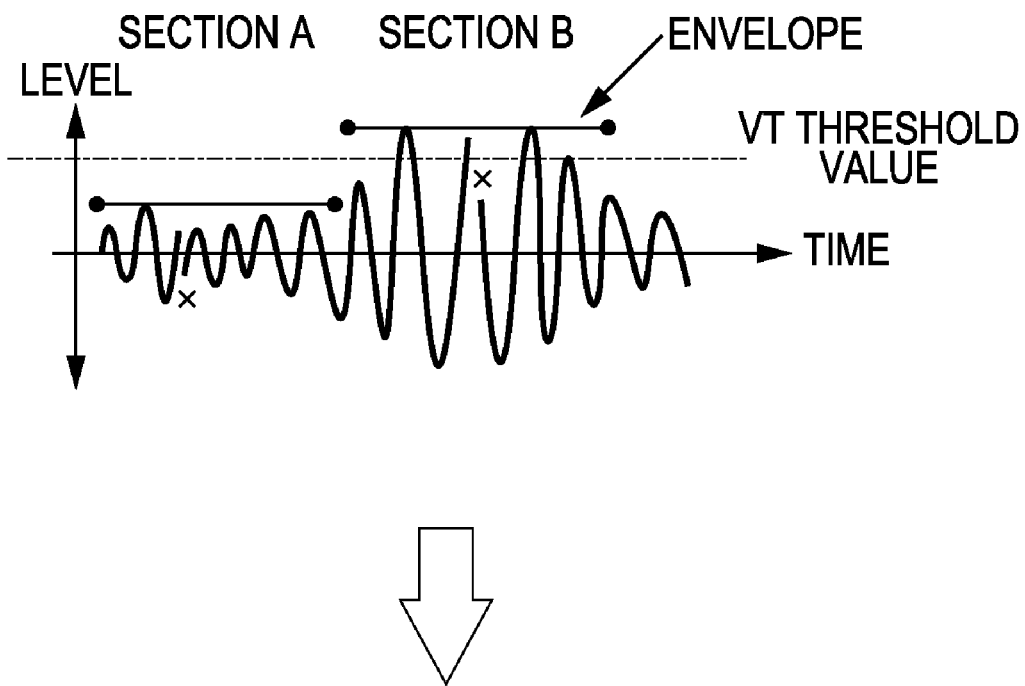
FIGS. 8A and 8B are diagrams illustrating processing determination by an envelope.
Figure 8B:
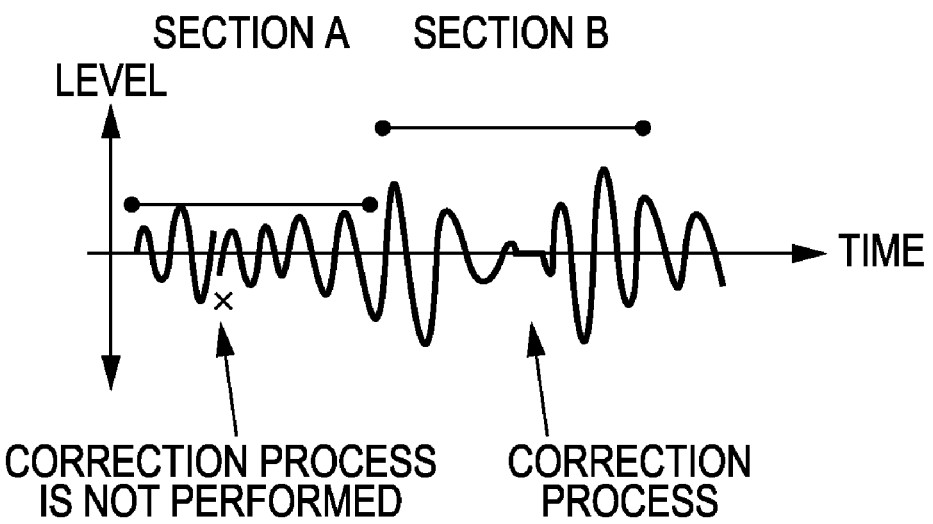

FIGS. 8A and 8B are diagrams illustrating processing determination by the envelope and the level difference.

Figure 9:
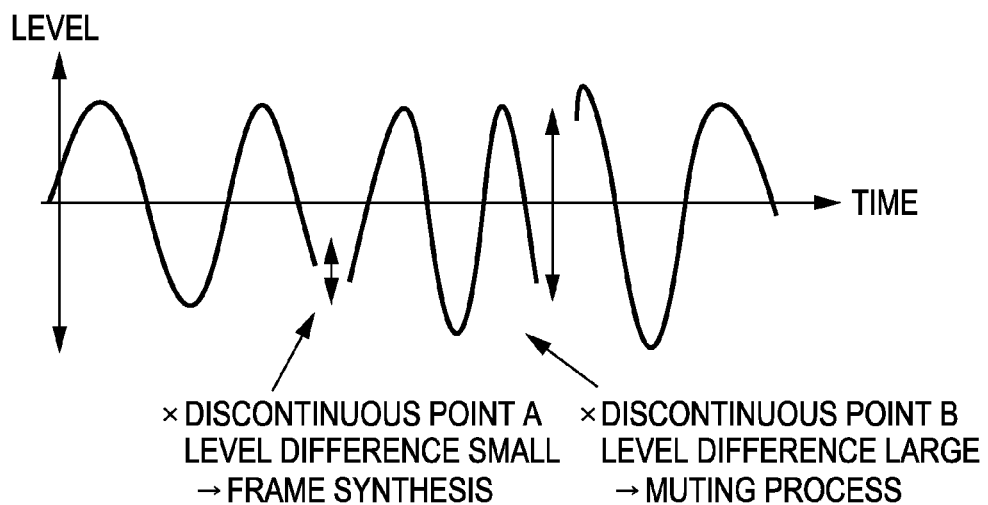
FIG. 9 is a diagram illustrating a process of determining whether or not a muting process or a frame synthesis process is performed according to level differences at a discontinuous point.

FIG. 9 is a diagram illustrating a process of determining whether or not the muting process or the frame synthesis process is performed according to the level difference of the discontinuous point.

Now, the processing determination using the envelope and the level difference will be described with reference to FIGS. 8A, 8B and 9.

As shown in FIGS. 8A and 8B, a volume and an envelope of each section having a voice signal are calculated, and the muting process or the like of the discontinuous point is not performed if the level of the envelope including the discontinuous point of the signal is less than a threshold value VT.

In contrast, if the level of the envelope is greater than the threshold value VT, since unpleasant noise may be generated in the discontinuous point and thus the correction process is performed.

The correction process performs the below-described muting process or frame (filter synthesis).

For example, as shown in FIGS. 8A and 8B, the processing determination unit 109 sets a section A composed of voice mainly having a small level to a non-target section of the correction process because the level of the envelope is less than the threshold value VT. The processing determination unit 109 sets a section B to a target section of the correction process because the level of the envelope is greater than the threshold value VT.

The envelope refers to the maximum value of the absolute value of the voice signal level in any section.

If the discontinuous point is in the break of an envelope calculation section, it is determined that it is an envelope before and after the discontinuous point.

As shown in FIG. 9, even when the correction process is performed, it is determined whether the muting process is performed or the frame synthesis process is performed according to the level difference of the discontinuous point.

In FIG. 9, since the level difference before and after a discontinuous point A is small, filter synthesis is performed and, since the level difference of a discontinuous point B is large, the muting process is performed.

The correction processing unit 111 determines that the correction process is necessary by the processing determination unit 109 and performs the correction process with respect to the decoded data if the information thereof is received through the switching unit 110.

The correction processing unit 111 has a function for selecting a proper correction process from the calculated frequency analysis, the envelope and the level difference.

The correction processing unit 111 includes the muting parameter setting unit 1111, mute processing unit 1112 for performing the muting process, the frame synthesis parameter setting unit 1113 and frame synthesis processing unit 1114 for performing the frame synthesis.

The correction processing unit 111 performs the muting process if the level difference is greater than the threshold value and performs the frame synthesis process if the level difference is less than the threshold value, as described above.

The correction processing unit 111 is configured to adjust the parameter of each process according to the level difference, by changing the parameter set by the muting parameter setting unit 1111 and the frame synthesis parameter setting unit 1113.

In addition, instead of the frame synthesis process, a simple filter process of voice data, such as FIR or IIR may be performed.

[Muting Process]

Figure 10:
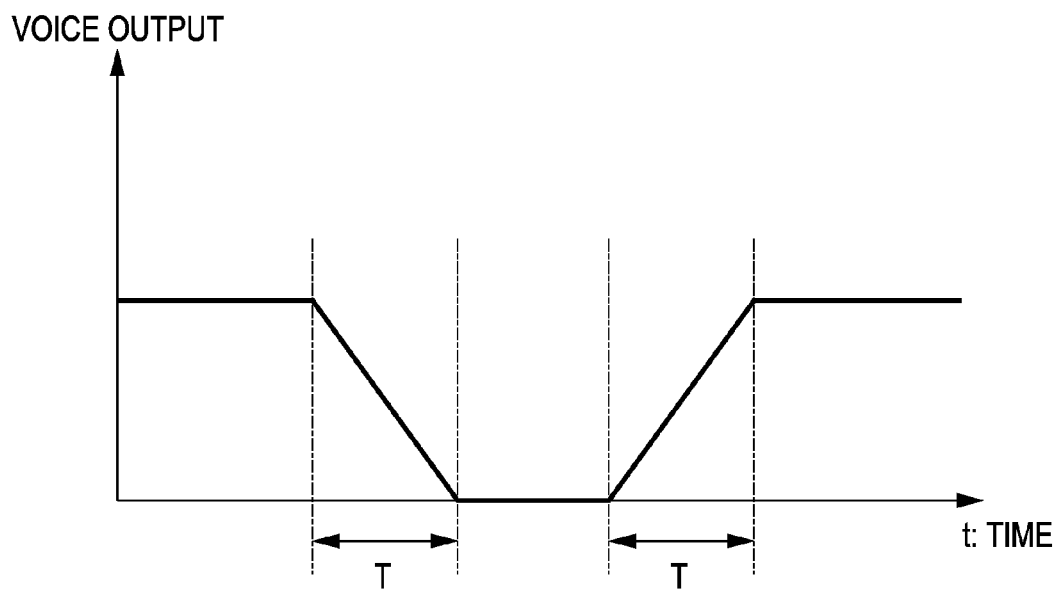
FIG. 10 is a diagram showing an example of setting a muting time constant.

FIG. 10 is a diagram showing an example of setting a muting time constant.

Figure 11:
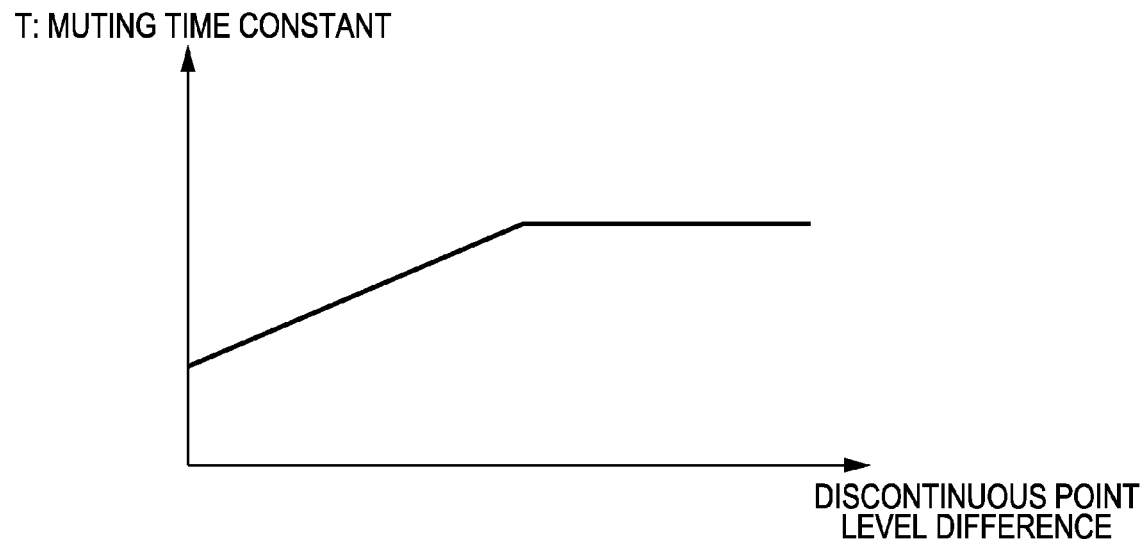
FIG. 11 is a diagram showing an example of setting a muting time constant according to a level difference.

FIG. 11 is a diagram showing an example of setting a muting time constant according to a level difference.

In the correction processing unit 111, a muting time constant is set according to a voice level difference as a mute control parameter with respect to the muting parameter setting unit 1111 at the time of the muting process.

For example, if the level difference of the discontinuous point is large to some degree, the time constant is set to be large and, if the level difference is small to some degree, the time constant is set to be small.

Accordingly, if the level difference is small, it is possible to rapidly perform control and, if the level difference is large, it is possible to avoid noise with certainty.

[Frame Synthesis Process]

Figure 12:
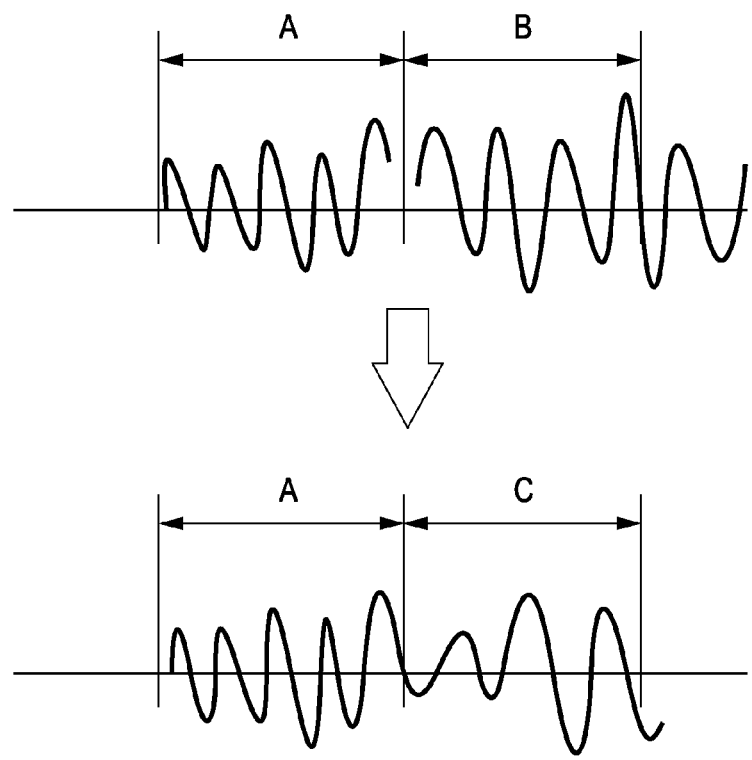
FIG. 12 is a conceptual diagram of a frame synthesis process according to the present embodiment.

FIG. 12 is a conceptual diagram of the frame synthesis process according to the present invention.

The frame synthesis processing unit 1114 calculates and synthesizes samples of the frames A and B before and after the discontinuous point using the following equation and generates a frame C.

$$Ci = \alpha Ai + (1-\alpha)Bi \qquad \text{Equation 3}$$

If the level difference of the discontinuous point is greater than any threshold value, the influence of the discontinuousness may not be absorbed in one frame and thus frame synthesis is performed over a plurality of frames.

A synthesis coefficient $\alpha$ may be changed according to the level difference.

[Effect of Correction Process after Decode]

The correction process of the discontinuous point is switched according to the frequency analysis, the envelope or the level difference so as to perform the control according to the types of the discontinuous points.

Therefore, it is possible reduce stops in voice reproduction due to muting and provide easy to listen to voice reproduction.

In addition, if the signal level or the level difference of the discontinuous point is large to some degree, noise generation is avoided by the frame synthesis or the muting process and thus the balance of voice quality can be maintained.

Figure 13:
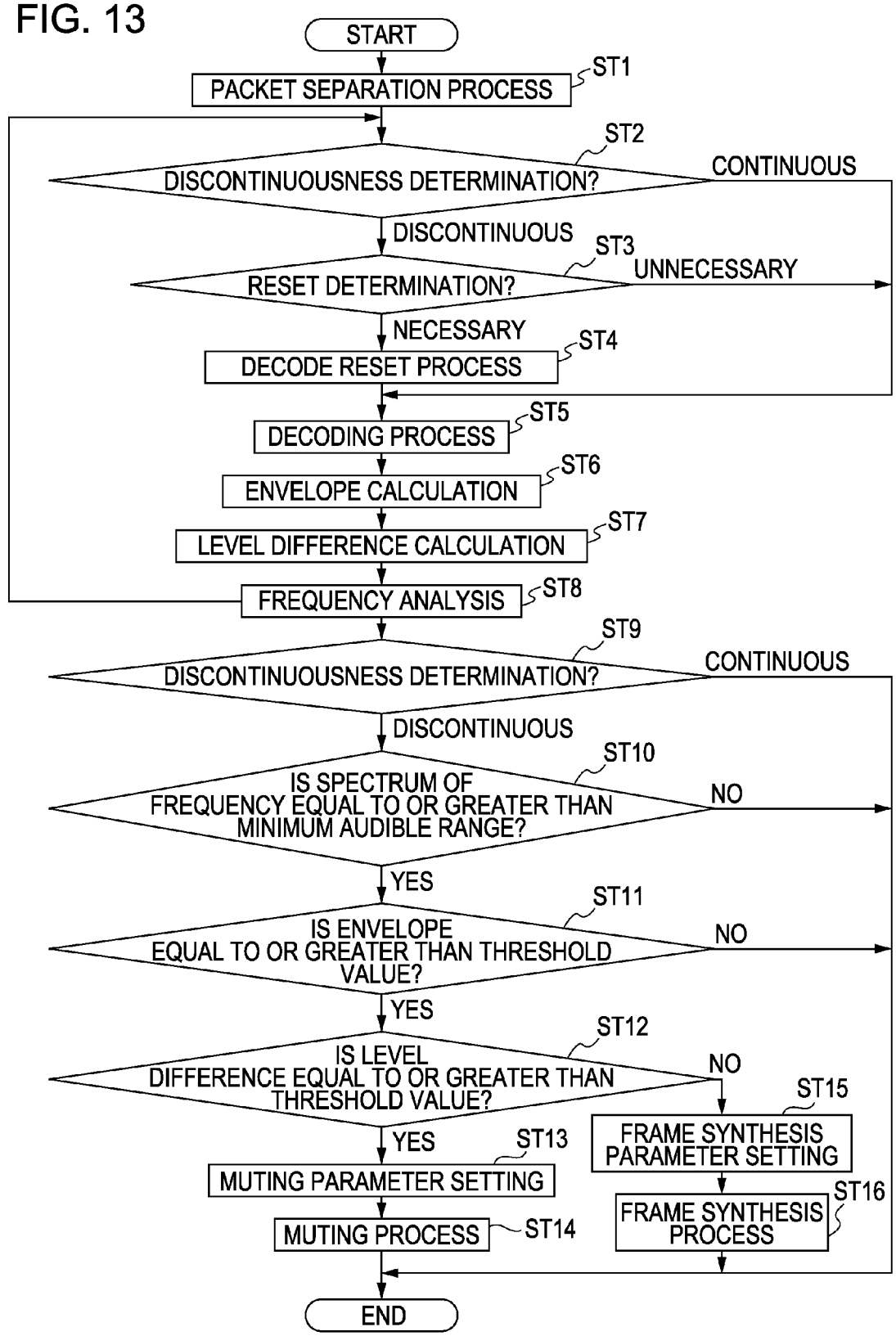
FIG. 13 is a flowchart illustrating an operation of the audio reproduction device according to the present embodiment.

FIG. 13 is a flowchart illustrating an operation of the audio reproduction device according to the present embodiment.

Next, the operation by the configuration of FIG. 2 will be described with respect to FIG. 13.

First, the packet separation unit 101 separates the input packet into the voice data and the packet information (ST1). The separated voice data is supplied to the input buffer unit 102 and the packet information is output to the discontinuousness determination unit 104.

The input buffer unit 102 holds the voice data for a predetermined time and outputs the held voice data to the decoding processor 103.

The discontinuousness determination unit 104 determines whether or not this packet is discontinuous with a preceding packet, from the packet information (ST2).

The result of determining whether or not the packet is discontinuous is supplied to the decode reset processing unit 105.

The decode reset processing unit 105 receives the result of the determination by the discontinuousness determination unit 104 and determines whether or not the reset process is necessary (ST3).

In step ST3, if it is determined that the reset process is necessary, the decoding information of the decoding processor 103 is reset (ST4).

That is, if it is determined that the packet is discontinuous by the discontinuousness determination unit 104, the reset process of the decoding processor 103 is performed by the decode reset processing unit 105.

In addition, after the process of step ST4, if it is determined that the packet is continuous in step ST2, or if it is determined that the reset process is unnecessary in step ST3, the decoding process is performed by the decoding processor 103 (ST5).

The decoded voice data is supplied to the frequency analysis unit 106, the envelope calculation unit 107, the level difference calculation unit 108, the processing determination unit 109 and the switching unit 110.

The envelope calculation unit 107 calculates the envelope of the decoded voice data and outputs the calculated result to the processing determination unit 109 (ST6).

The level difference calculation unit 108 calculates the voice level difference from the decoded voice data and outputs the calculated result to the processing determination unit 109 (ST7).

The frequency analysis unit 106 performs frequency analysis of the decoded voice data and outputs the analyzed result to the processing determination unit 109 (ST8).

The processing determination unit 109 determines whether or not the correction process is performed from the result of the frequency analysis and determines whether or not the packet is discontinuous (ST9).

In step ST9, if it is determined that the packet is discontinuous, the processing determination unit 109 determines whether the spectrum of the frequency is equal to or more than the minimum audible range (ST10).

In step ST10, if it is determined that the spectrum of the frequency is equal to or greater than the minimum audible range, the processing determination unit 109 determines whether the envelope is equal to or greater than the threshold value VT1 (ST11).

In step ST11, if it is determined that the envelope is equal to or greater than the threshold value VT1, it is then determined whether the level difference is equal to or greater than the threshold value VT2 (ST12).

In step ST12, if it is determined that the level difference is equal to or greater than the threshold value VT2, the processing determination unit 109 instructs the switching unit 110 to perform the muting process as the correction process.

The switching unit 110 outputs the decoded data to the correction processing unit 111 so as to switch the correction process to the muting process based on the result of the determination by the processing determination unit 109.

In the correction processing unit 111, the muting parameter setting unit 1111 sets the muting parameter (ST13) and the mute processing unit 1112 performs the muting process according to the set parameter (ST14).

In step ST12, if it is determined that the level difference is less than the threshold value VT2, the processing determination unit 109 instructs the switching unit 110 to perform the frame synthesis process as the correction process.

The switching unit 110 outputs the decoded data to the correction processing unit 111 so as to switch the correction process to the frame synthesis process based on the result of the determination by the processing determination unit 109.

In the correction processing unit 111, the frame synthesis parameter setting unit 1113 sets the frame synthesis parameter (ST15) and the frame synthesis processing unit 1114 performs the frame synthesis process according to the set parameter (ST16).

If it is determined that the packet is continuous in step ST9, if it is determined that the spectrum of the frequency is less than the minimum audible range in step ST10, or if it is determined that the envelope is less than the threshold value VT1 in step ST11, it is determined that the correction process is unnecessary.

By the above process, the decoded voice data is output from the output buffer 112 without correction or after being subjected to the correction process.

According to the above-described present embodiment, the audio reproduction device 100 has the following configuration.

The audio reproduction device 100 includes the packet separation unit 101 for separating the input packet into the voice data and the packet information, the input buffer unit 102 for holding the voice data for a predetermined time, and the decoding processor 103 for decoding the input voice data.

The audio reproduction device 100 includes the discontinuousness determination unit 104 for determining from the packet information whether or not this packet is discontinuous with the preceding packet and the reset processing unit 105 for resetting the decoding information if the packet is discontinuous.

The audio reproduction device 100 includes the frequency analysis unit 106 for performing the frequency analysis of the decoded data, and the envelope calculation unit 107 and level difference calculation unit 108 for calculating the envelope and the level difference.

The audio reproduction device 100 includes the processing determination unit 109 for determining whether or not the correction process is performed from the results of the frequency analysis, determines whether the packet is discontinuous, and determines which correction process is performed by the envelope and the level difference if the packet data is discontinuous.

The audio reproduction device 100 includes the switching unit 110 for switching the correction process based on the result of the determination by the processing determination unit 109 and the correction processing unit 111 for performing the designated correction process if the correction process is necessary.

Accordingly, according to the present embodiment, the following effects can be obtained.

It is possible to reduce stops in voice reproduction due to muting and provide easy to listen to voice reproduction.

If the signal level of the discontinuous point is large, since noise generation is avoided by the muting process and thus the balance of the voice quality can be maintained.

The audio reproduction device 100 according to the first embodiment is applicable to, for example, an information reproduction system such as a monitoring camera system.

Hereinafter, the information reproduction system using the audio reproduction device 100 according to the first embodiment will be described as second to fifth embodiments.

2. Second Embodiment

Figure 14:
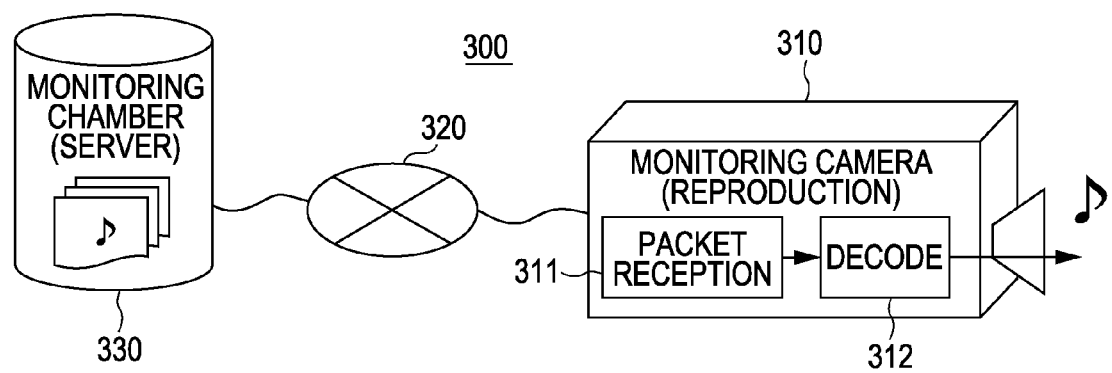
FIG. 14 is a diagram showing the overall configuration of a network type monitoring camera system using an audio reproduction device according to a first embodiment.

FIG. 14 is a diagram showing the overall configuration of a network type monitoring camera system using an audio reproduction device according to a first embodiment.

The network type monitoring camera system 300 of FIG. 14 is an example of a network type camera system having a reproduction function, and a monitoring camera 310 may communicate with a monitoring server 330 over a network 320.

The monitoring camera 310 has a packet reception unit 311 and a decoding unit 312.

The audio reproduction device 100 according to the first embodiment is applied to the inside of the decoding processor 312 after the packet is received at the side of the monitoring camera 310.

The decoding processor described herein shows the overall block diagram shown in FIG. 2.

3. Third Embodiment

Figure 15:
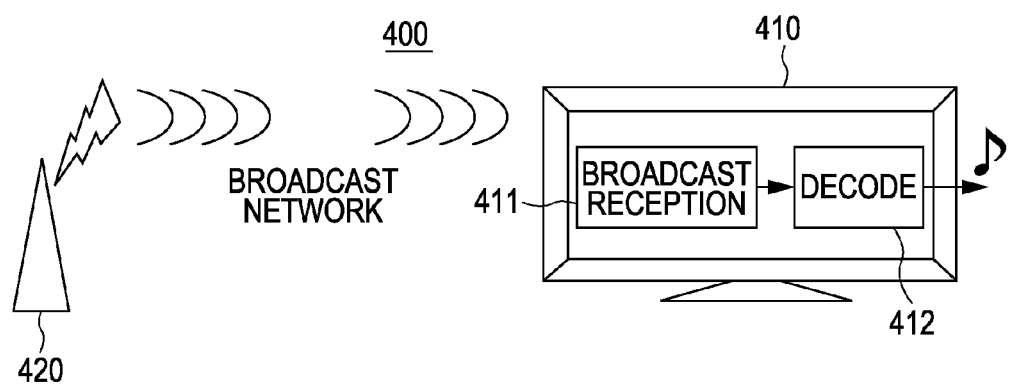
FIG. 15 is a diagram showing the overall configuration of a broadcast-based system using the audio reproduction device according to the first embodiment.

FIG. 15 is a diagram showing the overall configuration of a broadcast-based system using the audio reproduction device according to the first embodiment.

The broadcast-based system 400 of FIG. 15 has a television receiver 410 and a broadcast station 420.

The television receiver 410 has a broadcast reception unit 411 and a decoding processor 412.

The audio reproduction device 100 according to the first embodiment is applied to the inside of the decoding processor 412 after a broadcast of the television receiver 410 is received.

That is, in a device for receiving and reproducing a TV broadcast or the like, when the broadcast is received and decoded, the audio reproduction device 100 according to the first embodiment is applicable to a correction process of a discontinuous point of voice.

4. Fourth Embodiment

Figure 16:
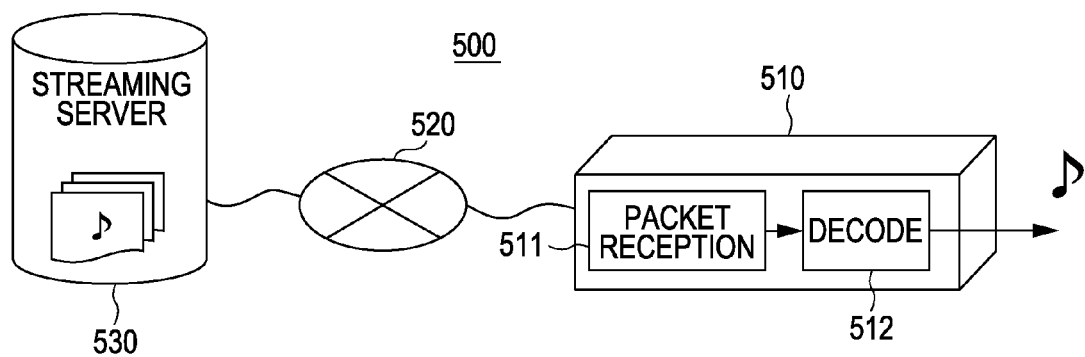
FIG. 16 is a diagram showing the overall configuration of a network-enabled reproduction system using the audio reproduction device according to the first embodiment.

FIG. 16 is a diagram showing the overall configuration of a network-enabled reproduction system using the audio reproduction device according to the first embodiment.

In the network-enabled reproduction system 500 of FIG. 16, a reproduction device 510 may communicate with a streaming server 530 over a network 520.

The reproduction device 510 has a packet reception unit 511 and a decoding unit 512.

The audio reproduction device 100 according to the first embodiment is applied to a correction process of a discontinuous point of music in the decoding processor 512 after a music packet is received at the side of the reproduction device 510.

5. Fifth Embodiment

Figure 17:
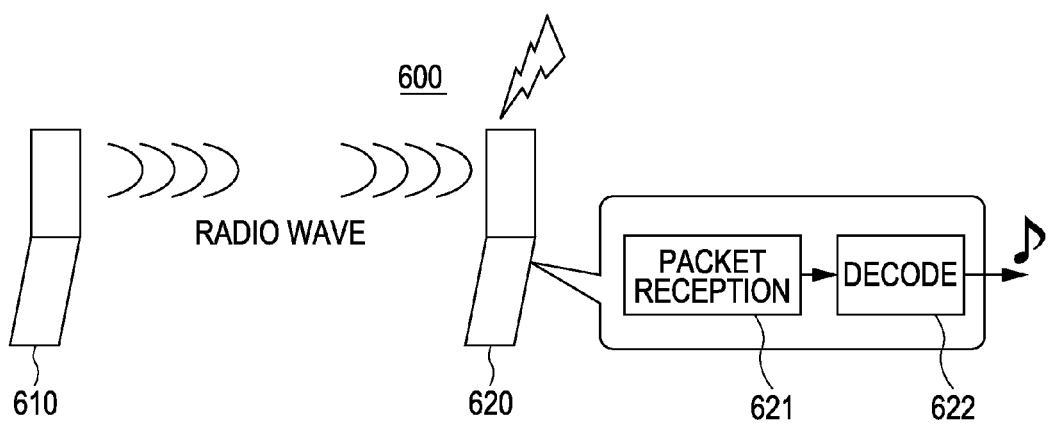
FIG. 17 is a diagram showing the overall configuration of a mobile telephone system using the audio reproduction device according to the first embodiment.

FIG. 17 is a diagram showing the overall configuration of a mobile telephone system using the audio reproduction device according to the first embodiment.

The mobile telephone system 600 of FIG. 17 is an example in which mobile telephones 610 and 620 perform wireless communication.

In the example of FIG. 17, the mobile telephone 620 has a packet reception unit 621 and a decoding processor 622.

When a mobile telephone voice packet is received and decoded, the audio reproduction device 100 according to the first embodiment is applicable to a correction process of a discontinuous point of voice.

The above-described method may be formed as a program according to the above procedure and may be configured to be executed by a computer such as a CPU.

Such a program may be accessed by a recording medium a semiconductor memory, a magnetic disc, an optical disc or a floppy (registered trademark) disc or a computer in which this recording medium is set so as to execute the program.

The present application contains subject matter related to that disclosed in Japanese Priority Patent Application JP 2009-008250 filed in the Japan Patent Office on Jan. 16, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An audio reproduction device comprising:
 a decoding processor configured to decode input voice data;
 a discontinuousness determination unit configured to determine from input packet information whether or not a packet is discontinuous with a preceding packet;
 a reset processing unit configured to reset decoding information if it is determined that the packet is discontinuous by the discontinuousness determination unit;
 a frequency analysis unit configured to perform frequency analysis on data decoded by the decoding processor;
 an envelope calculation unit configured to calculate an envelope of the data decoded by the decoding processor;
 a level difference calculation unit configured to calculate a level difference of the data decoded by the decoding processor;
 a correction processing unit configured to be able to perform a plurality of correction processes and to apply a specific correction process to decoded data if the correction process is necessary; and
 a processing determination unit configured to determine whether or not a correction process is to be performed from results of a frequency analysis, to determine whether or not a packet data is discontinuous, to determine which correction process is to be applied by the envelope and the level difference if the packet data is discontinuous, and to output an instruction to perform a correction process according to results of the determination.

2. The audio reproduction device according to claim 1, wherein the processing determination unit determines whether or not a frequency is equal to or greater than a predetermined audible range as the results of a frequency analysis if the packet data is discontinuous, and instructs the decoding processor to output the decoded data without performing the correction process if the frequency is less than the predetermined audible range.

3. The audio reproduction device according to claim 1 or 2, wherein the processing determination unit determines whether or not a frequency is equal to or greater than a predetermined audible range as results of the frequency analysis if the packet data is discontinuous, and instructs the correction processing unit to change a content of the correction process according to a voice level of a discontinuous point if of the frequency is equal to or greater than the predetermined audible range.

4. The audio reproduction device according to claim 3, wherein the processing determination unit determines that the correction process of a discontinuous point is unnecessary if the envelope before and after the discontinuous point is less than a first threshold value.

5. The audio reproduction device according to claim 4, wherein:
the correction processing unit is able to selectively process a muting process and a frame synthesis process according to the instruction as the correction process.

6. The audio reproduction device according to claim 5, wherein the correction processing unit is able to adjust a parameter of each of the processes according to a level difference.

7. The audio reproduction device according to claim 1, wherein the discontinuousness determination unit performs detection of discontinuousness based on discontinuous flag information set by a higher-level device.

8. The audio reproduction device according to claim 1, wherein the discontinuousness determination unit detects discontinuousness of a voice frame by a shape variation of the frequency.

9. The audio reproduction device according to claim 1, wherein:
the processing determination unit feeds back information indicating discontinuousness to the discontinuousness determination unit if it is determined that the packet data is discontinuous by flag information from a higher-level device or the result of analysis of the frequency analysis unit, and
the discontinuousness determination unit outputs an instruction to the reset processing unit such that a reset process is executed at the time of next decode.

10. An information reproduction system comprising:
an audio reproduction device configured to reproduce voice data from transmitted information,
wherein the audio reproduction device includes
a decoding processor configured to decode input voice data,
a discontinuousness determination unit configured to determine whether or not a packet is discontinuous with a preceding packet, from input packet information,
a reset processing unit configured to reset decoding information if it is determined that the packet is discontinuous by the discontinuousness determination unit,
a frequency analysis unit configured to perform frequency analysis on data decoded by the decoding processor,
an envelope calculation unit configured to calculate an envelope of the data decoded by the decoding processor,
a level difference calculation unit configured to calculate a level difference of the data decoded by the decoding processor,
a correction processing unit configured to be able to perform a plurality of correction processes and to apply a specific correction process to the decoded data if the correction process is necessary, and
a processing determination unit configured to determine whether or not a correction process is to be performed from results of the frequency analysis, to determine whether or not a packet data is discontinuous, to determine which correction process is to be applied by the envelope and the level difference if the packet data is discontinuous, and to output an instruction to perform a correction process according to the results of the determination.

11. An audio reproduction method comprising the steps of:
decoding input voice data;
determining from input packet information whether or not a packet is discontinuous with a preceding packet;
resetting decoding information if, in determining discontinuousness, it is determined that the packet is discontinuous;
performing frequency analysis on the decoded data;
calculating an envelope of the decoded data;
calculating a level difference of the decoded data;
determining whether or not a correction process is to be performed from the results of the frequency analysis, determining whether or not the packet data is discontinuous, determining a correction process to be applied by the envelope and the level difference if the packet data is discontinuous, and outputting an instruction to perform the correction process according to the result of the determination; and
applying a specific correction process to the decoded data if the correction process is necessary.

12. A computer readable medium on which is stored a program that when executed on a computer, performs an audio reproduction method comprising the steps of:
decoding input voice data;
determining from input packet information whether or not a packet is discontinuous with a preceding packet;
resetting decoding information if, in determining discontinuousness, it is determined that the packet is discontinuous;
performing frequency analysis on the decoded data;
calculating an envelope of the decoded data;
calculating a level difference of the decoded data;
determining whether or not a correction process is to be performed from the results of the frequency analysis, determining whether or not a packet data is discontinuous, determining a correction process to be applied by the envelope and the level difference if a packet data is discontinuous, and outputting an instruction to perform a correction process according to results of the determination; and
applying a specific correction process to the decoded data if the correction process is necessary.

* * * * *